(12) United States Patent
Hsieh et al.

(10) Patent No.: US 12,260,831 B2
(45) Date of Patent: Mar. 25, 2025

(54) METHOD FOR DRIVING ELECTRONIC DEVICE

(71) Applicant: InnoLux Corporation, Miao-Li County (TW)

(72) Inventors: Yu-Lin Hsieh, Miao-Li County (TW); Chien-Hao Kuo, Miao-Li County (TW); Cheng-Shen Pan, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/450,580

(22) Filed: Aug. 16, 2023

(65) Prior Publication Data
US 2024/0105128 A1 Mar. 28, 2024

(30) Foreign Application Priority Data

Sep. 28, 2022 (CN) .......................... 202211190785.4

(51) Int. Cl.
G09G 3/3291 (2016.01)
H04N 7/01 (2006.01)
(52) U.S. Cl.
CPC .......... G09G 3/3291 (2013.01); H04N 7/013 (2013.01)
(58) Field of Classification Search
CPC ............... G09G 3/3291; G09G 3/3696; G09G 2310/0267; G09G 2330/028; G09G 3/3674; G09G 3/3266; G09G 2340/0435; H04N 7/013
See application file for complete search history.

(56) References Cited

U.S. PATENT DOCUMENTS

| | | | | |
|---|---|---|---|---|
| 10,002,570 B2* | 6/2018 | Lin | ...................... | G09G 3/3225 |
| 10,395,618 B2* | 8/2019 | Lee | ...................... | G09G 3/3674 |
| 11,195,468 B2* | 12/2021 | Park | ...................... | G09G 3/3291 |
| 11,271,181 B1* | 3/2022 | Yang | ................. | H01L 27/14609 |
| 11,289,029 B1* | 3/2022 | Sung | .................... | G09G 3/3208 |
| 11,307,698 B2* | 4/2022 | Jo | ........................ | G06F 3/0412 |
| 2009/0295786 A1* | 12/2009 | Ito | ....................... | G09G 3/3648 |
| | | | | 345/215 |
| 2010/0259700 A1* | 10/2010 | Lai | ..................... | G02F 1/13624 |
| | | | | 345/212 |
| 2010/0265168 A1 | 10/2010 | Neugebauer | | |
| 2014/0320478 A1* | 10/2014 | Oh | ....................... | G09G 3/2025 |
| | | | | 345/212 |
| 2017/0206850 A1* | 7/2017 | Kim | ..................... | G09G 3/3696 |
| 2019/0272799 A1* | 9/2019 | Kim | ..................... | G09G 3/3648 |

(Continued)

Primary Examiner — Ibrahim A Khan
(74) Attorney, Agent, or Firm — McClure, Qualey & Rodack, LLP

(57) ABSTRACT

A method for driving an electronic device includes the following steps: receiving a first image data, detecting a first frame rate corresponding to the first image data, generating at least one first scanning signal according to the first image data, receiving a second image data, detecting a second frame rate corresponding to the second image data, and generating at least one second scanning signal according to the second image data. The at least one first scanning signal has a first high voltage level value. The at least one second scanning signal has a second high voltage level value. When the first frame rate is different from the second frame rate, the first high voltage level value is different from the second high voltage level value.

17 Claims, 8 Drawing Sheets

(56) References Cited

U.S. PATENT DOCUMENTS

| | | | |
|---|---|---|---|
| 2020/0005723 A1* | 1/2020 | Kim | G09G 3/3696 |
| 2021/0110771 A1* | 4/2021 | Lee | G09G 3/3258 |
| 2021/0125559 A1* | 4/2021 | Park | G09G 3/3233 |
| 2023/0016947 A1* | 1/2023 | Kim | G09G 3/3275 |
| 2023/0089652 A1* | 3/2023 | Li | G09G 3/3655 |
| | | | 345/212 |
| 2023/0154405 A1* | 5/2023 | Noh | G09G 3/3233 |
| | | | 345/204 |
| 2023/0335076 A1* | 10/2023 | Liao | G09G 3/3696 |
| 2024/0038123 A1* | 2/2024 | Sang | G09G 3/3233 |
| 2024/0161704 A1* | 5/2024 | Kim | G09G 3/3266 |

* cited by examiner

METHOD FOR DRIVING ELECTRONIC DEVICE

CROSS REFERENCE TO RELATED APPLICATIONS

This application claims priority of China Patent Application No. 202211190785.4, filed on Sep. 28, 2022, the entirety of which is incorporated by reference herein.

BACKGROUND OF THE DISCLOSURE

Field of the Disclosure

The disclosure relates to a driving method, and in particular, to a method for driving an electronic device.

Description of the Related Art

Conventional electronic devices may have a power-saving requirement to prolong the lifespan of the battery. When such an electronic device detects that there is no high-frequency requirement for the current frame rate, the electronic device may decrease the frequency (i.e., decrease the frame rate), so as to reduce the power consumption of the electronic device. However, after the electronic device decreases the frequency (i.e., a low-frequency operation), the frame time is elongated with the decrease in frequency. As a result, this may cause leakage in the internal components of the electronic device, as well as frame flickering. Therefore, a new design for a circuit structure is needed to solve the problem described above.

BRIEF SUMMARY OF THE DISCLOSURE

An embodiment of the disclosure provides a method for driving an electronic device, which includes the following steps: receiving a first image data, detecting a first frame rate corresponding to the first image data, generating at least one first scanning signal according to the first image data, receiving a second image data, detecting a second frame rate corresponding to the second image data, and generating at least one second scanning signal according to the second image data. The at least one first scanning signal has a first high voltage level value. The at least one second scanning signal has a second high voltage level value. When the first frame rate is different from the second frame rate, the first high voltage level value is different from the second high voltage level value.

An embodiment of the disclosure provides a method for driving an electronic device, which includes the follow steps: receiving a first image data, detecting a first frame rate corresponding to the first image data, generating at least one first scanning signal according to the first image data, receiving a second image data, detecting a second frame rate corresponding to the second image data, and generating at least one second scanning signal according to the second image data. The at least one first scanning signal has a first low voltage level value. The at least one second scanning signal has a second low voltage level value. When the first frame rate is different from the second frame rate, the first low voltage level value is different from the second low voltage level value.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
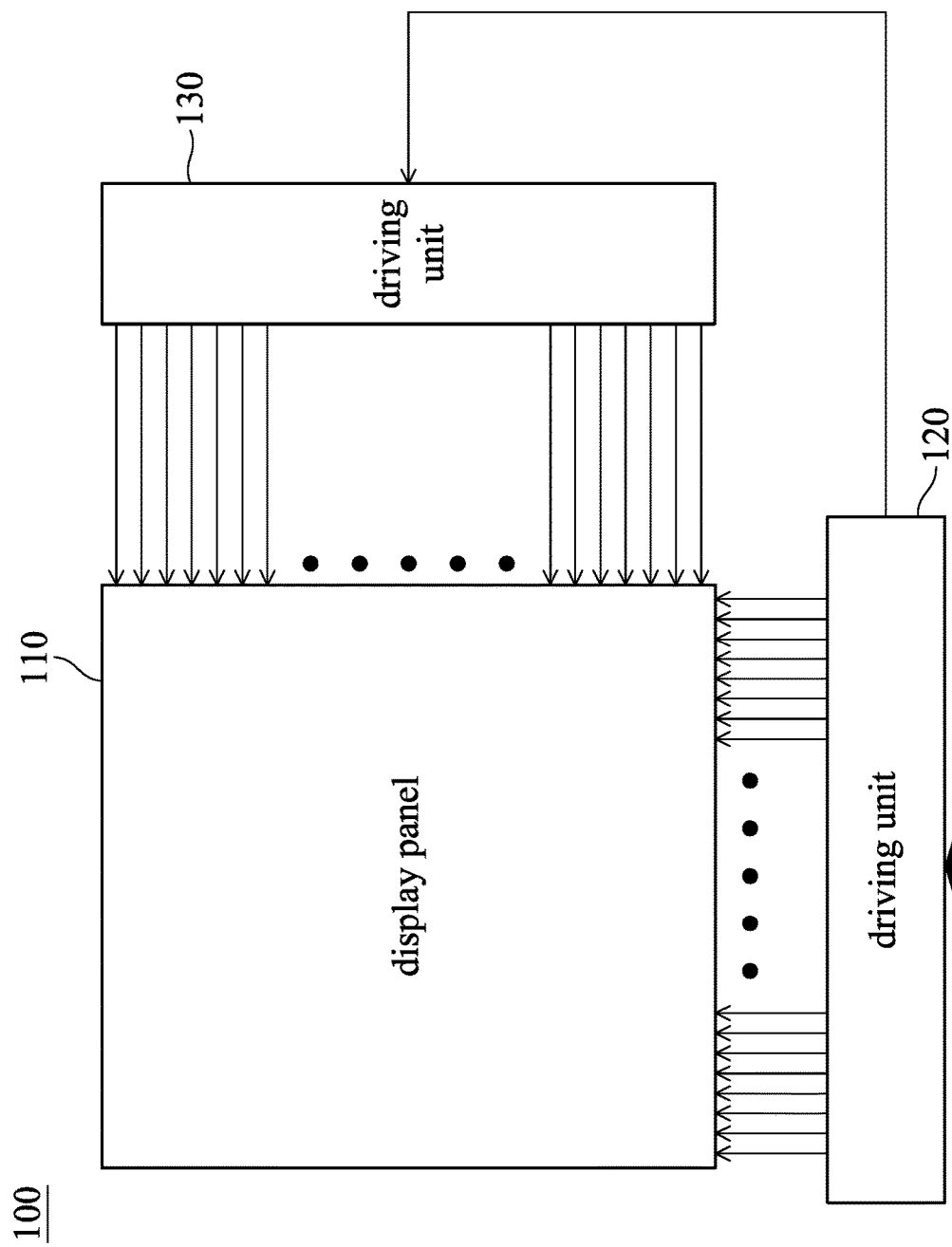
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term "coupled" may include any direct and indirect means of electrical connection.

In the text, the terms "substantially" or "approximately" usually means within 20%, or within 10%, or within 5%, or within 3%, or within 2%, or within 1%, or within 0.5% of a given value or range. The quantity given here is an approximate quantity. That is, without the specific description of "substantially" or "approximately", the meaning of "substantially" or "approximately" may still be implied.

The "including" mentioned in the entire specification and claims is an open term, so it should be interpreted as "including or comprising but not limited to".

Furthermore, "connected or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may at least include a display panel 110, a driving unit 120 and a driving unit 130.

The display panel 110 may include at least one pixel unit, and the pixel unit may at least include a thin film transistor and a storage capacitor, but the disclosure is not limited thereto. The thin film transistor may be electrically connected to the storage capacitor. In the embodiment, the display panel 110 may be a liquid crystal display panel (LCD panel). It should be noted that although the disclosure takes the display panel as an example, the technology disclosed by the disclosure may be applied to other devices using the thin film transistor, such as the light emitting device using the mini LED or the micro LED as a light source.

The driving unit 120 may be electrically connected to the display panel 110. The driving panel 120 may receive an image data, detect a frame rate corresponding to the image data, and generate a corresponding control signal according to the frame rate. In addition, in some embodiments, the driving unit 120 may generate a corresponding common voltage according to the frame rate corresponding to the image data. In some embodiments, the driving unit 120 may control a power source unit (not shown) to generate a corresponding common voltage to the storage capacitor of the at least one pixel unit according to the frame rate corresponding to the image data. In the embodiment, the driving unit 120 may be a driver IC, but the disclosure is not limited thereto.

The driving unit 130 may be electrically connected to the display panel 110 and the driving unit 120. The driving unit 130 may receive the control signal generated by the driving unit 120, and generate at least one corresponding scanning signal to the thin film transistor of the at least one pixel unit according to the control signal, so as to drive the thin film transistor. In the embodiment, the driving unit 130 may be a gate driver, such as a "(gate on panel (GOP)" driving circuit, but the disclosure is not limited thereto. Therefore, the electronic device 100 of the embodiment may correspondingly generate the scanning signals with different high voltage level values and different low voltage level values and/or different common voltages to the pixel unit according to different frame rates of the image data (for example, when the frame rate changes, the scanning signal may also change to have different high voltage level values and different low voltage level values at the same time), so as to decrease the leakage phenomenon, decrease the frame flickering phenomenon or make the charging of the pixel unit enough.

Figure 2:
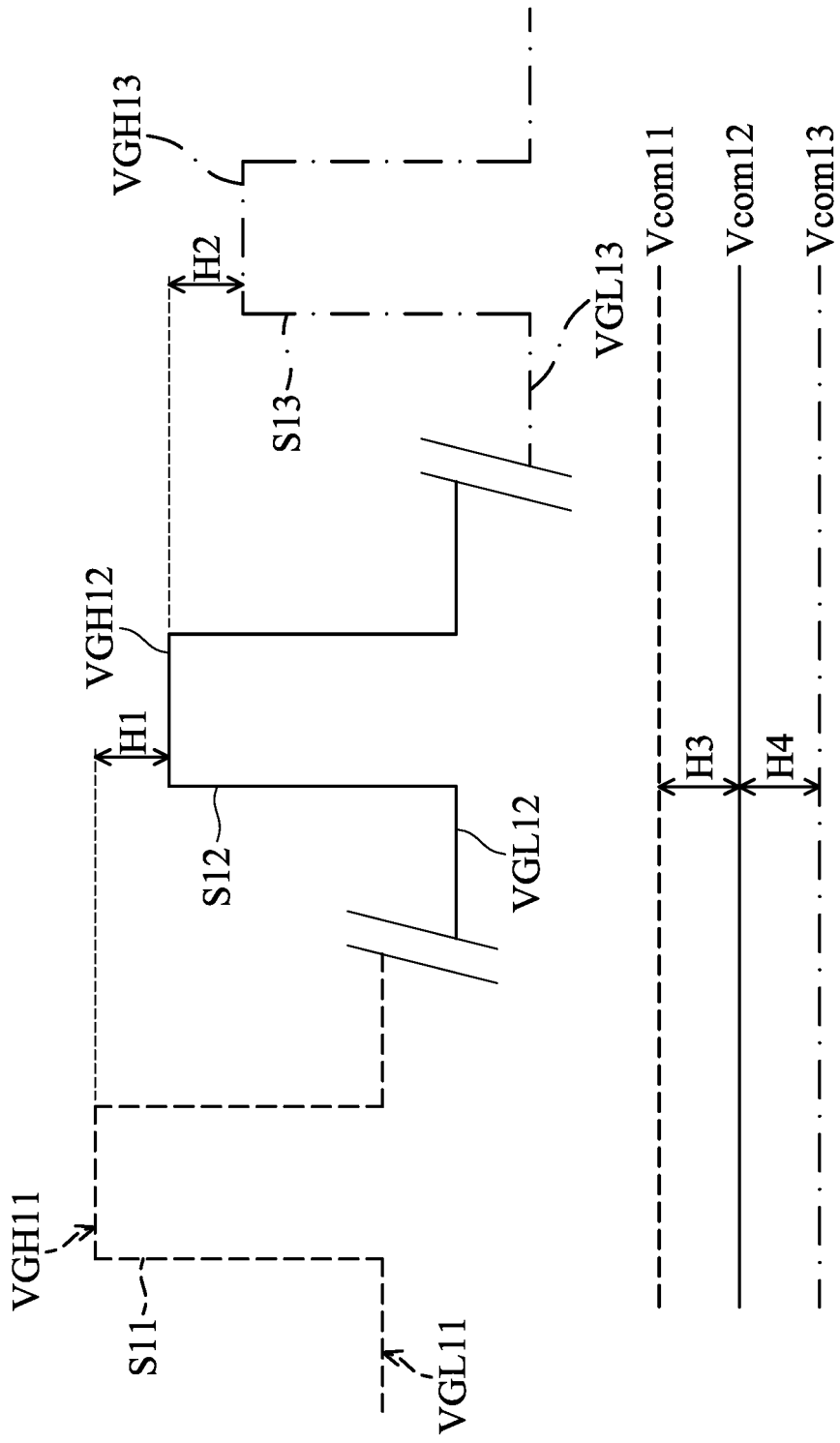
FIG. 2 is a waveform diagram of a scanning signal and a common voltage according to an embodiment of the disclosure.

FIG. 2 is a waveform diagram of a scanning signal and a common voltage according to an embodiment of the disclosure. In the embodiment, the thin film transistor may be an N-type thin film transistor, but the disclosure is not limited thereto. Please refer to FIG. 1 and FIG. 2. The driving unit 120 may receive a first image data, and detect a first frame rate corresponding to the first image data. Then, the driving unit 120 may generate a first control signal according to the first frame rate corresponding to the first image data. In addition, the driving unit 120 may generate a first common voltage Vcom11 according to the first frame rate corresponding to the first image data, or the driving unit 120 may control the power source unit to generate the first common voltage Vcom11 according to the first frame rate corresponding to the first image data. Afterward, the driving unit 130 may receive the first control signal generated by the driving unit 120, and generate at least one first scanning signal S11 according to the first control signal, wherein the first scanning signal S11 may have a high voltage level value VGH11 and a low voltage level value VGL11.

Then, the driving unit 120 may receive a second image data, and detect a second frame rate corresponding to the second image data. Afterward, the driving unit 120 may generate a second control signal according to the second frame rate corresponding to the second image data. In addition, the driving unit 120 may generate a second common voltage Vcom12 according to the second frame rate corresponding to the second mage data, or the driving unit 120 may control the power source unit to generate the second common voltage Vcom12 according to the second frame rate corresponding to the second image data. Afterward, the driving unit 130 may receive the second control signal generated by the driving unit 120, and generate at least one second scanning signal S12 according to the second control signal, wherein the second scanning signal S12 may have a high voltage level value VGH12 and a low voltage level value VGL12.

Afterward, the driving unit 120 may receive a third second image data, and detect a third frame rate corresponding to the third image data. Then, the driving unit 120 may generate a third control signal according to the third frame rate corresponding to the third image data. In addition, the driving unit 120 may generate a third common voltage Vcom13 according to the third frame rate corresponding to the third mage data, or the driving unit 120 may control the power source unit to generate the third common voltage Vcom13 according to the third frame rate corresponding to the third image data. Afterward, the driving unit 130 may receive the third control signal generated by the driving unit 120, and generate at least one third scanning signal S13 according to the third control signal, wherein the third scanning signal S13 may have a high voltage level value VGH13 and a low voltage level value VGL13. It should be noted that in the disclosure, since the first scanning signal to the third scanning signal may not be continuously generated, oblique lines are used as the intervals between various scanning signals in the figure.

In some embodiments, when the first frame rate is different from the second frame rate, the high voltage level value VGH11 of the first scanning signal S11 may be different from the high voltage level value VGH12 of the second scanning signal S12. Furthermore, when the first frame rate is greater than the second frame rate, the high voltage level value VGH11 is, for example, greater than the high voltage level value VGH12, i.e., there is a distance H1 between the high voltage level value VGH11 and the high voltage level value VGH12. When the second frame rate is different from the third frame rate, the high voltage level value VGH12 of the second scanning signal S12 may be different from the high voltage level value VGH13 of the third scanning signal S13. Furthermore, when the second frame rate is different from the third frame rate, the high voltage level value VGH12 is, for example, greater than the high voltage level value VGH13, i.e., there is a distance H2 between the high voltage level value VGH12 and the high voltage level value VGH13. In the embodiment, the distance H1 and the distance H2 may be the same or different, and the distance H1 and the distance H2 are respectively in the range of 0.01 to 12V (i.e., $0.01 \leq VH1 \leq 12V$, $0.01V \leq H2 \leq 12V$), but the disclosure is not limited thereto. For the display panel using the N-type thin film transistor, since the frame rate increases, the charging time of the pixel unit is shortened. Therefore, after increasing the high voltage level value, the turning-on degree of the gate terminal may be increased, to that the charging speed of the pixel unit is faster.

In some embodiments, when the first frame rate is different from the second frame rate, the low voltage level value VGL11 of the first scanning signal S11 may be different from the low voltage level value VGL12 of the second scanning signal S12. Furthermore, when the first frame rate is greater than the second frame rate, the low voltage level value VGL11 is, for example, greater than the low voltage level value VGL12. When the second frame rate is different from the third frame rate, the low voltage level value VGL12 of the second scanning signal S12 may be different from the low voltage level value VGL13 of the third scanning signal S13. Furthermore, when the second frame rate is different from the third frame rate, the low voltage level value VGL12 is, for example, greater than the low voltage level value VGL13. In other words, in the embodiment of FIG. 2, when the frame rate increases, the high voltage level value and the low voltage level value of the scanning signal also increase. When the frame rate decreases, the high voltage level value and the low voltage level value of the scanning signal also decrease. It should be noted that in the embodiment of FIG. 2, although the high voltage level value and the low voltage level value of the scanning signal may change with the frame rate, the difference between the high voltage level value and the low voltage level value of each of the scanning signal may substantially maintain the same.

In the embodiments, when the first frame rate is different from the second frame rate, the first common voltage Vcom11 may be different from the second common voltage Vcom12. Furthermore, when the first frame rate is greater than the second frame rate, the first common voltage Vcom11 is, for example, greater than the second common voltage Vcom12, there is a distance H3 between the first common voltage Vcom11 and the second common voltage Vcom12. When the second frame rate is different from the third frame rate, the second common voltage Vcom12 may be different from the third common voltage Vcom13. Furthermore, when the second frame rate is different from the third frame rate, the second common voltage Vcom12 is, for example, greater than the third common voltage Vcom13, i.e., there is a distance H4 between the second common voltage Vcom12 and the third common voltage Vcom13. In the embodiment, the distance H3 and the distance H4 may be the same or different, and the distance H3 and the distance H4 are respectively in the range of 0.01 to 12V (i.e., $0.01V \leq H3 \leq 12V$, $0.01V \leq H4 \leq 12V$), but the disclosure is not limited thereto. It should be noted that changing the common voltage with the change of the frame rate, it may decrease the flickering phenomenon caused by the feed through voltage generated by the parasitic capacitance of the circuit in the display panel when the scanning signal changes with the change of the frame rate.

In some embodiments, the range of the frame rate of the electronic device 100 is, for example, 50 Hz to 155 Hz, 25 Hz to 130 Hz, or 25 to 155 Hz, but the disclosure is not limited thereto. In addition, in the disclosure, the second frame rate corresponds, for example, a general frame rate (such as 60 Hz or 90 Hz), the first frame rate corresponds, for example, a situation after the frequency is increased (for example, the frame rate is increased), and the third frame rate corresponds, for example, a situation after the frequency is decreased (for example, the frame rate is decreased), but the disclosure is not limited thereto.

In FIG. 2, the sequence of the first scanning signal S11, the second scanning signal S12 and the third scanning signal S13 is an exemplary embodiment of the disclosure, but the disclosure is not limited thereto. In other embodiments, the user may adjust the sequence of the first scanning signal S11, the second scanning signal S12 and the third scanning signal S13 according to the requirements thereof, and the same effect may also be achieved.

In addition, in the disclosure, when the frame rate of the image data increases (i.e., the frequency is increased), the frame time corresponding to the image data becomes shorter, and the width of the scanning signal (such as the first scanning signal S11) becomes narrower with the frame time changing shorter, but the disclosure is not limited thereto.

Figure 3:
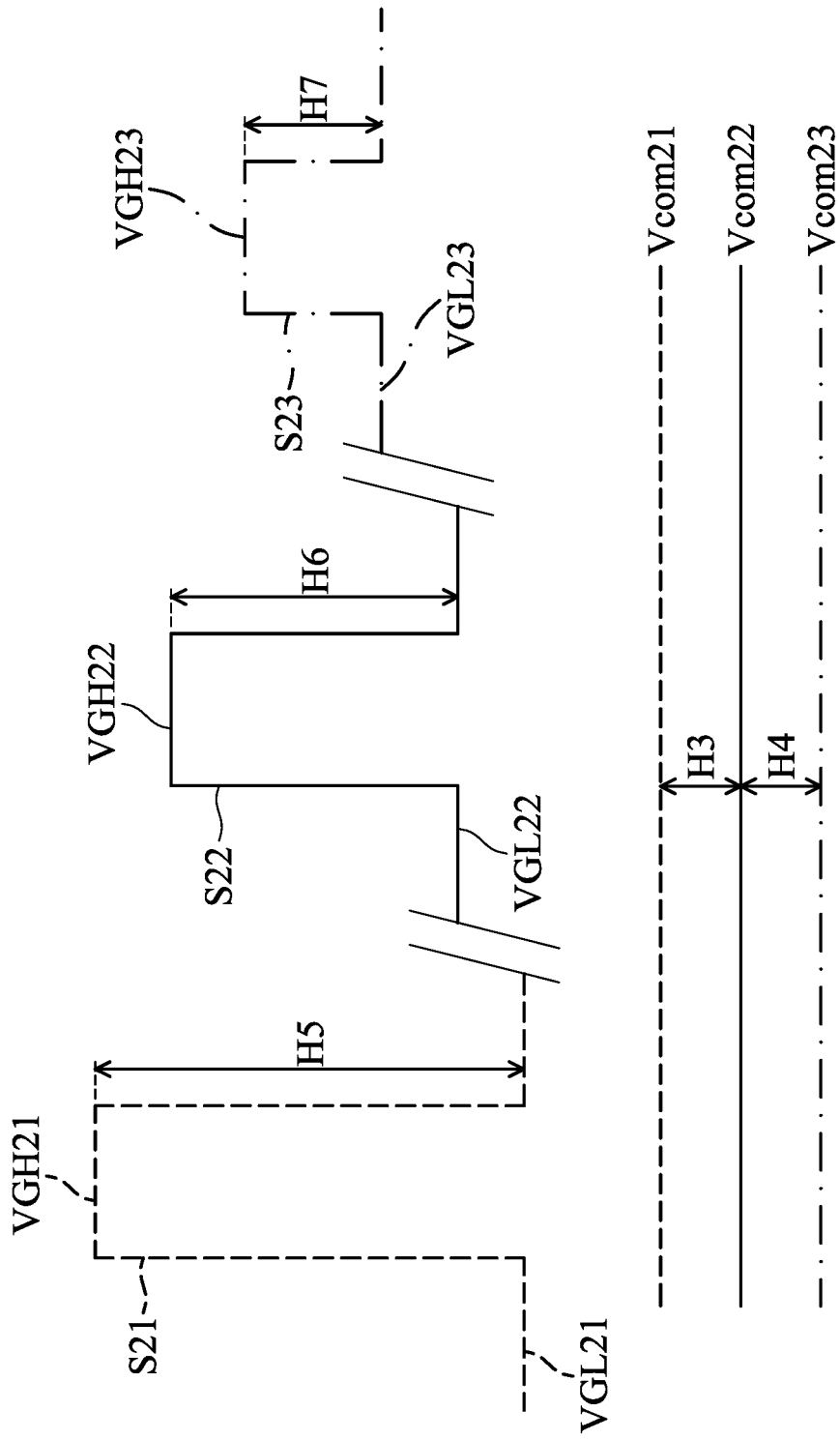
FIG. 3 is a waveform diagram of a scanning signal and a common voltage according to an embodiment of the disclosure.

FIG. 3 is a waveform diagram of a scanning signal and a common voltage according to an embodiment of the disclosure. In the embodiment, the thin film transistor may be an N-type thin film transistor, but the disclosure is not limited thereto. In the embodiment, the generating manner of the scanning signals S21, S22 and S23 may be the same as the embodiment of FIG. 2, and the description thereof is not repeated herein.

The difference between the embodiment of FIG. 3 and the embodiment of FIG. 2 is that in FIG. 3, when the first frame rate is different from the second frame rate, a difference H5 between the high voltage level value VGH21 and the low voltage level value VGL21 of the first scanning signal S21 may be different from a difference H6 between the high voltage level value VGH22 and the low voltage level value VGL22 of the second scanning signal S22. Furthermore, when the first frame rate is greater than the second frame rate, the distance H5 is, for example, greater than the distance H6. When the second frame rate is different from the third frame rate, the difference H6 between the high voltage level value VGH22 and the low voltage level value VGL22 of the second scanning signal S22 may be different from a distance H7 between the high voltage level value VGH23 and the low voltage level value VGL23 of the third scanning signal S23. Furthermore, when the second frame rate is greater than the third frame rate, the distance H6 is, for example, greater than the distance H7. In the embodiment, the distance H5 is, for example, the distance H6 plus 0.01V to 20V (i.e., $0.01V \leq (H5-H6) \leq 20V$), and the distance H7 is, for example, the distance H6 minus 0.01V to 20V (i.e., $0.01V \leq (H6-H7) \leq 20V$), but the disclosure is not limited thereto.

Similar to FIG. 2, since the generating manner and the voltage value change range of the common voltages Vcom21, Vcom22 and Vcom23 in the embodiment may be the same as the common voltages Vcom11, Vcom12 and Vcom13 of the embodiment in FIG. 2, the description thereof is not repeated herein.

In FIG. 3, the sequence of the first scanning signal S21, the second scanning signal S22 and the third scanning signal S23 is an exemplary embodiment of the disclosure, but the disclosure is not limited thereto. In other embodiments, the user may adjust the sequence of the first scanning signal S21, the second scanning signal S22 and the third scanning signal S23 according to the requirements thereof, and the same effect may also be achieved.

Figure 4:
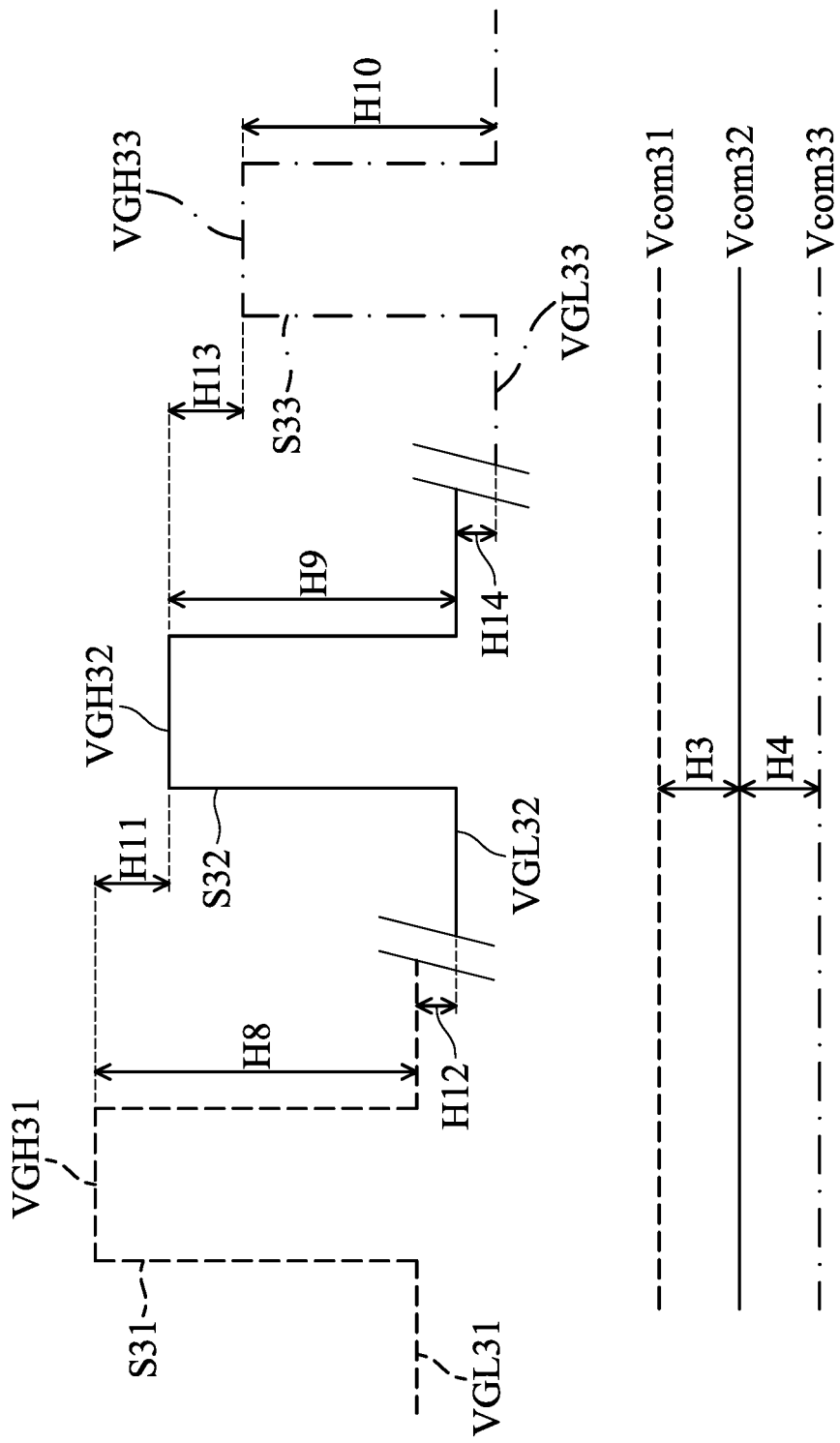
FIG. 4 is a waveform diagram of a scanning signal and a common voltage according to an embodiment of the disclosure.

FIG. 4 is a waveform diagram of a scanning signal and a common voltage according to an embodiment of the disclosure. In the embodiment, the thin film transistor may be an N-type thin film transistor, but the disclosure is not limited thereto. In the embodiment, the generating manner of the scanning signals S31, S32 and S33 may be the same as the embodiment of FIG. 2, and the description thereof is not repeated herein.

The difference between the embodiment of FIG. 4 and the embodiments of FIG. 2 and FIG. 3 is that in some embodiments, when the first frame rate is different from the second frame rate, a difference H8 between the high voltage level value VGH31 and the low voltage level value VGL31 of the first scanning signal S31 may be different from a difference H9 between the high voltage level value VGH32 and the low voltage level value VGL32 of the second scanning signal S32. However, at the same time, the high voltage level value VGH31 and the low voltage level value VGL31 of the first scanning signal S31 are also respectively higher than the high voltage level value VGH32 and the low voltage level value VGL32 of the second scanning signal S32. Furthermore, when the first frame rate is greater than the second frame rate, the distance H8 is, for example, greater than the distance H9. Similarly, when the second frame rate is different from the third frame rate, the difference H9 between the high voltage level value VGH32 and the low voltage level value VGL32 of the second scanning signal S32 may be different from a distance H10 between the high voltage level value VGH33 and the low voltage level value VGL33 of the third scanning signal S33. However, at the same time, the high voltage level value VGH32 and the low voltage level value VGL32 of the second scanning signal S32 are also respectively higher than the high voltage level value VGH33 and the low voltage level value VGL33 of the third scanning signal S33. Furthermore, when the second frame rate is greater than the third frame rate, the distance H9 is, for example, greater than the distance H10. In the embodiment, the distance H8 is, for example, the distance H9 plus 0.01V to 20V (i.e., $0.01V \leq (H8-H9) \leq 20V$), and the distance H10 is, for example, the distance H9 minus 0.01V to 20V (i.e., $0.01 \leq V(H9-H10) \leq 20V$), but the disclosure is not limited thereto.

In some embodiments, when the first frame rate is different from the second frame rate, a difference H11 between the high voltage level value VGH31 of the first scanning signal S31 and the high voltage level value VGH32 of the second scanning signal S32 may be different from a difference H12 between the low voltage level value VGL31 of the first scanning signal S31 and the low voltage level value VGL32 of the second scanning signal S32. Furthermore, when the first frame rate is greater than the second frame rate, the distance H11 is, for example, greater than the distance H12. When the second frame rate is different from the third frame rate, a difference H13 between the high voltage level value VGH32 of the second scanning signal S32 and the high voltage level value VGH33 of the third scanning signal S33 may be different from a distance H14 between the low voltage level value VGL32 of the second scanning signal S32 and the low voltage level value VGL33 of the third scanning signal S33. Furthermore, when the second frame rate is greater than the third frame rate, the distance H13 is, for example, greater than the distance H14.

In some embodiments, when the frame rates are different, the common voltages may also be different. Since the generating manner and the voltage value change range of the common voltages Vcom31, Vcom32 and Vcom33 in the embodiment may be the same as the common voltages Vcom11, Vcom12 and Vcom13 of the embodiment in FIG. 2, the description thereof is not repeated herein.

In FIG. 4, the sequence of the first scanning signal S31, the second scanning signal S32 and the third scanning signal S33 is an exemplary embodiment of the disclosure, but the disclosure is not limited thereto. In other embodiments, the user may adjust the sequence of the first scanning signal S31, the second scanning signal S32 and the third scanning signal S33 according to the requirements thereof, and the same effect may also be achieved.

Figure 5:
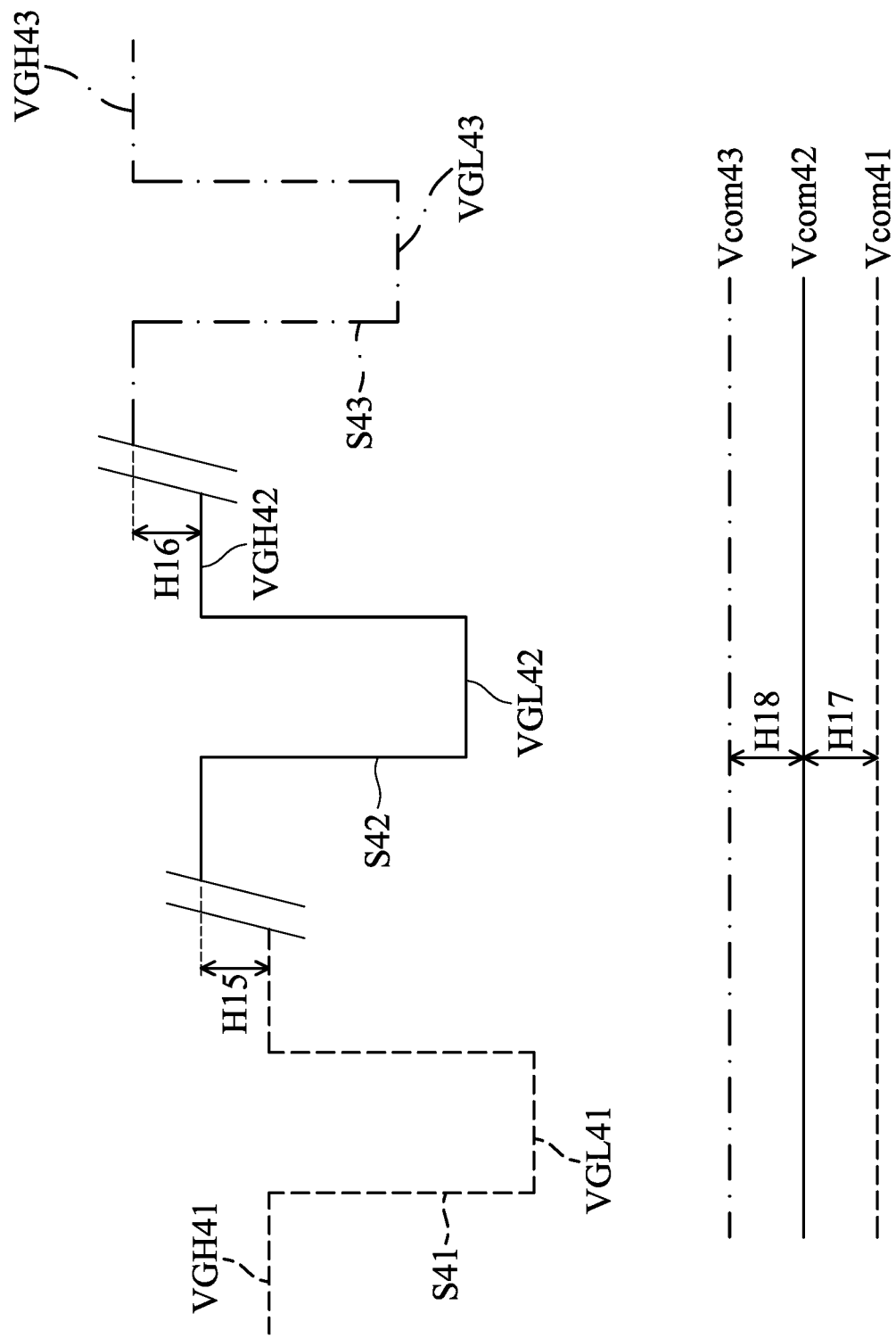
FIG. 5 is a waveform diagram of a scanning signal and a common voltage according to an embodiment of the disclosure.

FIG. 5 is a waveform diagram of a scanning signal and a common voltage according to an embodiment of the disclosure. In the embodiment, the thin film transistor may be a P-type thin film transistor, but the disclosure is not limited thereto. In the embodiment, the generating manner of the scanning signals S41, S42 and S43 may be the same as the embodiment of FIG. 2, and the description thereof is not repeated herein.

The difference between the embodiment of FIG. 5 and the embodiment of FIG. 2 is that since the thin film transistor in the embodiment is a P-type thin film transistor, the waveform appearances of the driving signals S41 to S43 are different from those of the driving signals S11 to S13 in FIG. 2. In addition, when the first frame rate is different from the second frame rate, the high voltage level value VGH41 of the first scanning signal S41 may be different from the high voltage level value VGH42 of the second scanning signal S42. Furthermore, when the first frame rate is greater than the second frame rate, the high voltage level value VGH41 is, for example, smaller than the high voltage level value VGH42, i.e., there is a distance H15 between the high voltage level value VGH41 and the high voltage level value VGH42. When the second frame rate is different from the third frame rate, the high voltage level value VGH42 of the second scanning signal S42 may be different from the high voltage level value VGH43 of the third scanning signal S43. Furthermore, when the second frame rate is greater than the third frame rate, the high voltage level value VGH42 is, for example, smaller than the high voltage level value VGH43, i.e., there is a distance H16 between the high voltage level value VGH42 and the high voltage level value VGH43. In the embodiment, the distance H15 and the distance H16 may be the same or different, and the distance H15 and the distance H6 are respectively in the range of 0.01 to 12V (i.e., $0.01V \leq H15 \leq 12V$, $0.01V \leq H6 \leq 12V$), but the disclosure is not limited thereto.

In some embodiments, when the first frame rate is different from the second frame rate, the low voltage level value VGL41 of the first scanning signal S41 may be different from the low voltage level value VGL42 of the second scanning signal S42. Furthermore, when the first frame rate is greater than the second frame rate, the low voltage level value VGL41 is, for example, smaller than the low voltage level value VGL42. When the second frame rate is different from the third frame rate, the low voltage level value VGL42 of the second scanning signal S42 may be different from the low voltage level value VGL43 of the third scanning signal S43. Furthermore, when the second frame rate is different from the third frame rate, the low voltage level value VGL42 is, for example, smaller than the low voltage level value VGL43.

In the embodiment, the generating manner of the common voltages Vcom41 to Vcom43 may be the embodiment of FIG. 2, and the description thereof is not repeated herein. Different from FIG. 2, in some embodiments, since the thin film transistor in the embodiments is a P-type thin film transistor, when the first frame rate is greater than the second frame rate, the first common voltage Vcom41 is, for example, smaller than the second common voltage Vcom42, i.e., there is a distance H17 between the first common voltage Vcom41 and the second common voltage Vcom42. When the second frame rate is greater than the third frame rate, the second common voltage Vcom42 is, for example, smaller than the third common voltage Vcom43, i.e., there is a distance H18 between the second common voltage Vcom42 and the third common voltage Vcom43. In the embodiment, the distance H17 and the distance H18 may be the same or different, and the distance H17 and the distance H18 are respectively in the range of 0.01 to 12V ($0.01V \leq H17 \leq 12V$, $0.01V \leq H18 \leq 12V$), but the disclosure is not limited thereto.

In FIG. 5, the sequence of the first scanning signal S41, the second scanning signal S42 and the third scanning signal S43 is an exemplary embodiment of the disclosure, but the disclosure is not limited thereto. In other embodiments, the user may adjust the sequence of the first scanning signal S41, the second scanning signal S42 and the third scanning signal S43 according to the requirements thereof, and the same effect may also be achieved.

Figure 6:
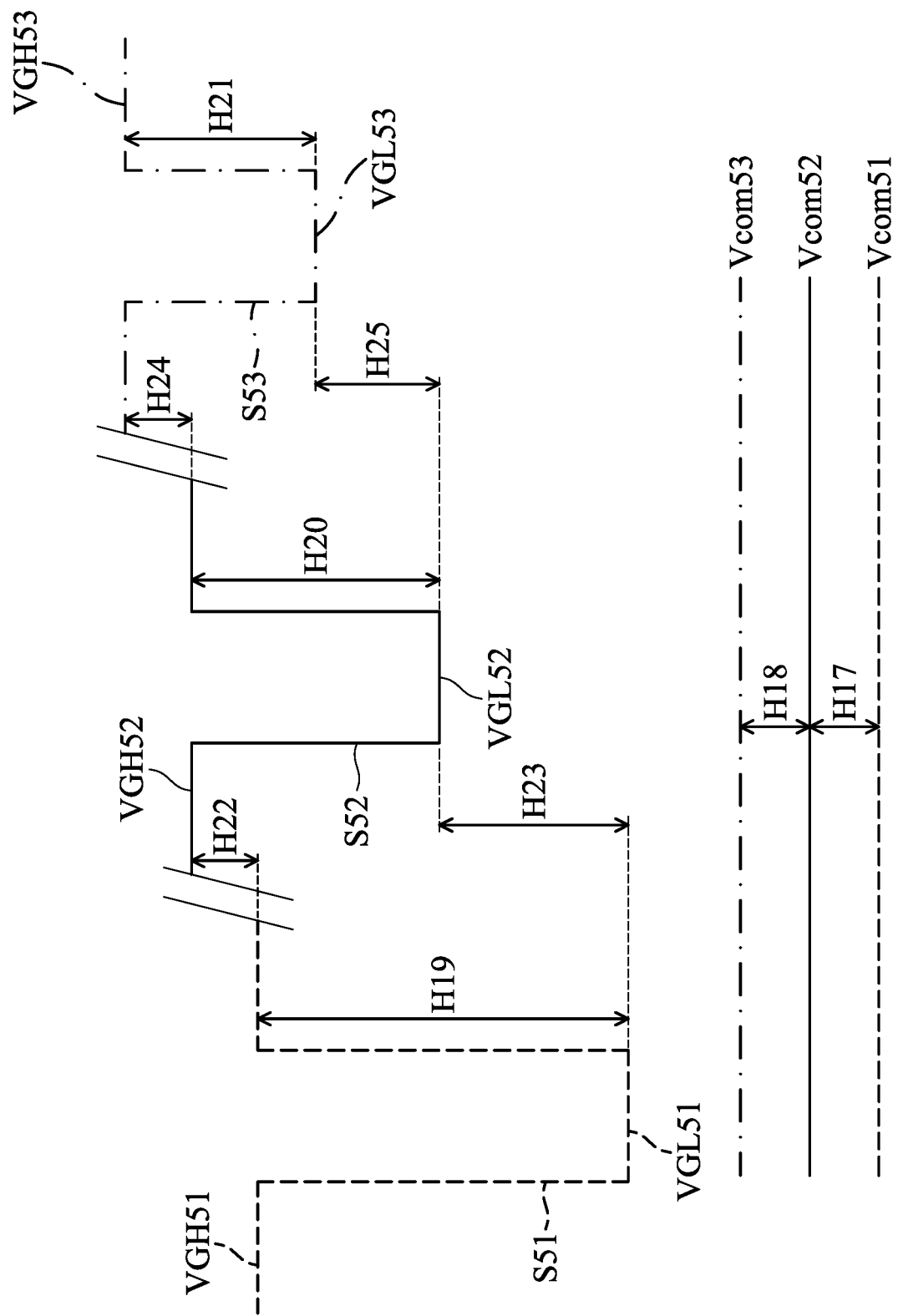
FIG. 6 is a waveform diagram of a scanning signal and a common voltage according to an embodiment of the disclosure.

FIG. 6 is a waveform diagram of a scanning signal and a common voltage according to an embodiment of the disclosure. In the embodiment, the thin film transistor may be a P-type thin film transistor, but the disclosure is not limited thereto. In the embodiment, the generating manner of the scanning signals S51, S52 and S53 may be the same as the embodiment of FIG. 2, and the description thereof is not repeated herein.

The difference between the embodiment of FIG. 6 and the embodiment of FIG. 5 is that is some embodiments of FIG. 6, when the first frame rate is different from the second frame rate, a distance H19 between the high voltage level value VGH51 and the low voltage level value VGL51 of the first scanning signal S51 may be different from a distance H20 between the high voltage level value VGH52 and the low voltage level value VGL52 of the second scanning signal S52. However, in the embodiment of FIG. 5, the difference between the high voltage level value and the low voltage level value of each of the scanning signals is substantially the same as each other. Furthermore, in the embodiment of FIG. 6, when the first frame rate is greater than the second frame rate, the distance H19 is, for example, greater than the distance H20. When the second frame rate is different from the third frame rate, a distance H20 between the high voltage level value VGH52 and the low voltage level value VGL52 of the second scanning signal S52 may be different from a distance H21 between the high voltage level value VGH53 and the low voltage level value VGL53 of the third scanning signal S53. Furthermore, when the second frame rate is greater than the third frame rate, the distance H20 is, for example, greater than the distance H21. In the embodiment, the distance H19 is, for example, the distance H20 plus 0.01V to 20V (i.e., $0.01V \leq (H19-H20) \leq 20V$), and the distance H21 is, for example, the distance H20 minus 0.01V to 20V (i.e., $0.01V \leq (H20-H21) \leq 20V$), but the disclosure is not limited thereto.

In some embodiments, when the first frame rate is different from the second frame rate, a difference H22 between the high voltage level value VGH51 of the first scanning signal S51 and the high voltage level value VGH52 of the second scanning signal S52 may be different from a difference H23 between the low voltage level value VGL51 of the first scanning signal S51 and the low voltage level value VGL52 of the second scanning signal S52. Furthermore, when the first frame rate is greater than the second frame rate, the distance H22 is, for example, smaller than the distance H23. When the second frame rate is different from the third frame rate, a difference H24 between the high voltage level value VGH52 of the second scanning signal S52 and the high voltage level value S53 of the third scanning signal S53 may be different from a distance H25 between the low voltage level value VGL52 of the second scanning signal S52 and the low voltage level value VGL53 of the third scanning signal S53. Furthermore, when the second frame rate is greater than the third frame rate, the distance H24 is, for example, smaller than the distance H25.

In some embodiments, when the frame rates are different, the common voltages may also be different. Since the generating manner and the voltage value change range of the common voltages Vcom51, Vcom52 and Vcom53 in the embodiment may be the same as the common voltages Vcom41, Vcom42 and Vcom43 of the embodiment in FIG. 5, the description thereof is not repeated herein.

In FIG. 6, the sequence of the first scanning signal S51, the second scanning signal S52 and the third scanning signal S53 is an exemplary embodiment of the disclosure, but the disclosure is not limited thereto. In other embodiments, the user may adjust the sequence of the first scanning signal S51, the second scanning signal S52 and the third scanning signal S53 according to the requirements thereof, and the same effect may also be achieved.

Figure 7:
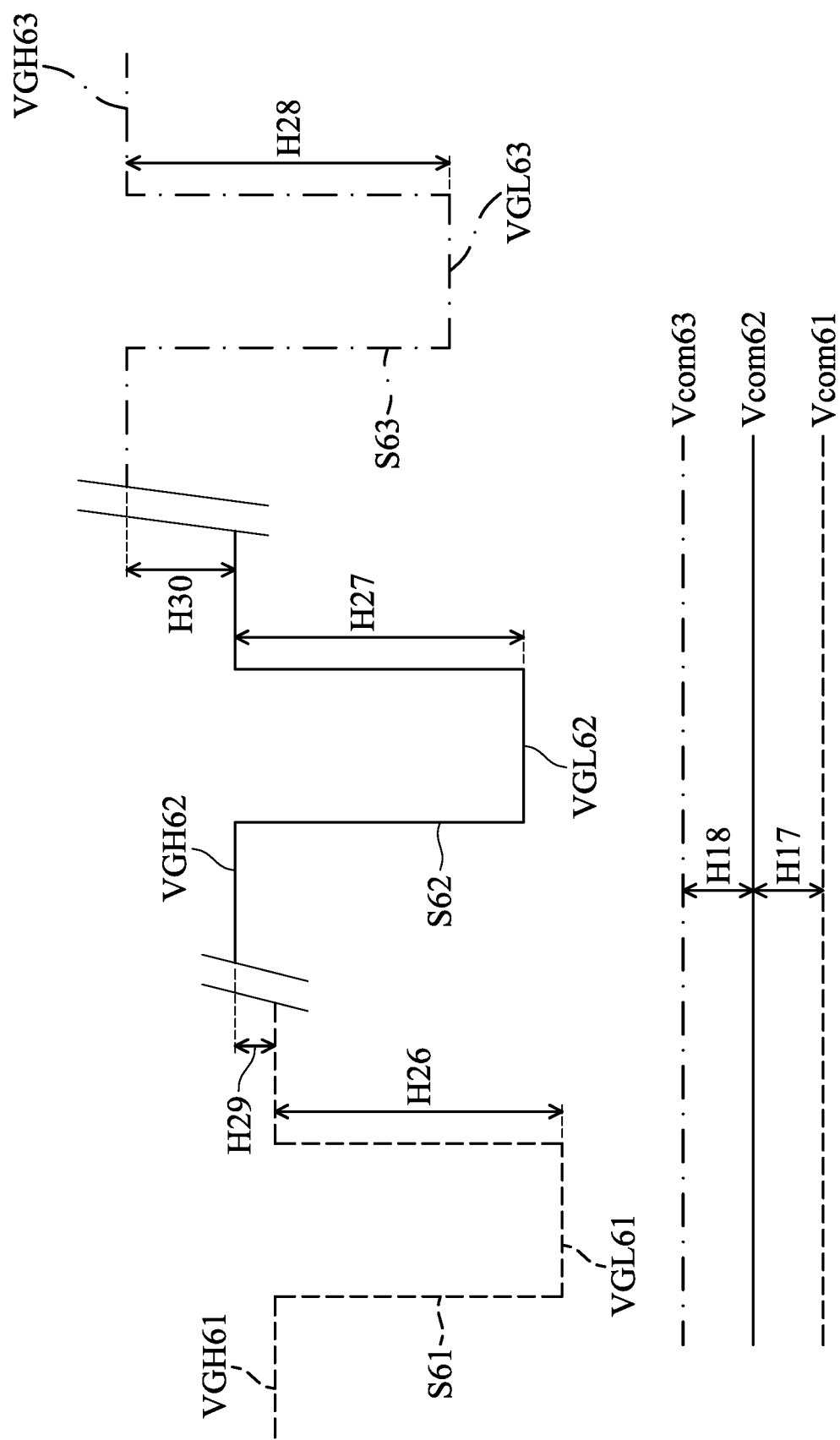
FIG. 7 is a waveform diagram of a scanning signal and a common voltage according to an embodiment of the disclosure.

FIG. 7 is a waveform diagram of a scanning signal and a common voltage according to an embodiment of the disclosure. In the embodiment, the thin film transistor may be a P-type thin film transistor, but the disclosure is not limited thereto. Since the generating manner of the scanning signals S61, S62 and S63 in the embodiment may be the same as the embodiment of FIG. 2, the description thereof is not repeated herein.

In some embodiments, when the first frame rate is different from the second frame rate, a difference H26 between the high voltage level value VGH61 and the low voltage level value VGL61 of the first scanning signal S61 6 may be different from a difference H27 between the high voltage level value VGH62 and the low voltage level value VGL62 of the second scanning signal S62. Furthermore, when the first frame rate is greater than the second frame rate, the distance H26 is, for example, smaller than the distance H27. Similarly, when the second frame rate is different from the third frame rate, the difference H27 between the high voltage level value VGH62 and the low voltage level value VGL62 of the second scanning signal S62 may be different from a distance H28 between the high voltage level value VGH63 and the low voltage level value VGL63 of the third scanning signal S63. Furthermore, when the second frame rate is greater than the third frame rate, the distance H27 is, for example, smaller than the distance H28. In the embodiment, the distance H26 is, for example, the distance H27 minus 0.01V to 20V (i.e., 0.01V≤(H27−H26)≤20V), and the distance H28 is, for example, the distance H27 plus 0.01V to 20V (i.e., 0.01V≤(H28−H27)≤20V), but the disclosure is not limited thereto.

In some embodiments, when the first frame rate is different from the second frame rate, the high voltage level value VGH61 of the first scanning signal S61 may be different from the high voltage level value VGH62 of the second scanning signal S62. Furthermore, when the first frame rate is greater than the second frame rate, the high voltage level value VGH61 is, for example, smaller than the high voltage level value VGH62, i.e., there is a distance H29 between the high voltage level value VGH61 and the high voltage level value VGH62. When the second frame rate is different from the third frame rate, the high voltage level value VGH62 of the second scanning signal S62 may be different from the high voltage level value VGH63 of the third scanning signal S63. Furthermore, when the second frame rate is greater than the third frame rate, the high voltage level value VGH62 is, for example, smaller than the high voltage level value VGH63, i.e., there is a distance H30 between the high voltage level value VGH62 and the high voltage level value VGH63. In the embodiment, the distance H29 may be smaller than the distance H30, but the disclosure is not limited thereto. It should be noted that for the P-type thin film transistor, the large distance means that the high voltage level value of the scanning signal may be at a higher voltage level value (for the P-type thin film transistor, the large distance means that the low voltage level value of the scanning signal may be at a lower voltage level value), so as to decrease the leakage phenomenon. The small distance may decrease the power consumption and save power. Therefore, the designer may adjust the scanning signal according to the actual requirements, and try to achieve a balance between the power consumption and the performance of the thin film transistor.

In some embodiments, when the frame rates are different, the common voltages may also be different. Since the generating manner and the voltage value change range of the common voltages Vcom61, Vcom62 and Vcom63 in the embodiment may be the same as the common voltages Vcom41, Vcom42 and Vcom43 of the embodiment in FIG. 5, the description thereof is not repeated herein.

In FIG. 7, the sequence of the first scanning signal S61, the second scanning signal S62 and the third scanning signal S63 is an exemplary embodiment of the disclosure, but the disclosure is not limited thereto. In other embodiments, the user may adjust the sequence of the first scanning signal S61, the second scanning signal S62 and the third scanning signal S63 according to the requirements thereof, and the same effect may also be achieved.

Figure 8:
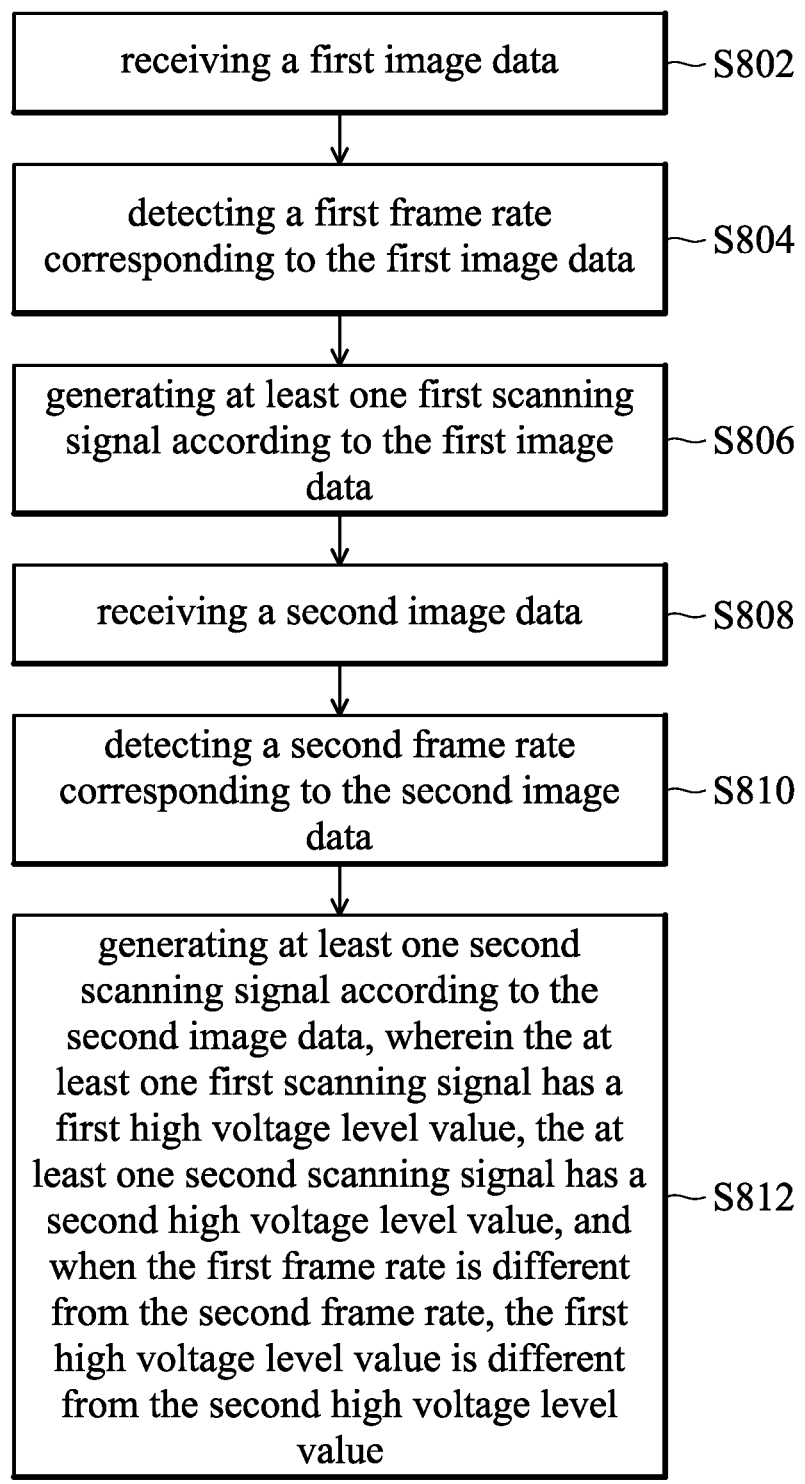
FIG. 8 is a flowchart of a method for driving an electronic device with a memory unit according to another embodiment of the disclosure.

FIG. 8 is a flowchart of a method for driving an electronic device with a memory unit according to another embodiment of the disclosure. In step S802, the method involves receiving a first image data. In step S804, the method involves detecting a first frame rate corresponding to the first image data. In step S806, the method involves generating at least one first scanning signal according to the first image data. In step S808, the method involves receiving a second image data. In step S810, the method involves detecting a second frame rate corresponding to the second image data. In step S812, the method involves generating at least one second scanning signal according to the second image data, wherein the at least one first scanning signal has a first high voltage level value, the at least one second scanning signal has a second high voltage level value, and when the first frame rate is different from the second frame rate, the first high voltage level value is different from the second high voltage level value.

In some embodiments, when the first frame rate is greater than the second frame rate, the first high voltage level value is, for example, greater than the second high voltage level value (for example, when the thin film transistor is the N-type thin film transistor). In some embodiment, the first frame rate is greater than the second frame rate, the first high voltage level value is, for example, less than the second high voltage level value (for example, when the thin film transistor is the P-type thin film transistor). In some embodiments, the first scanning signal has a first low voltage level value, the second scanning signal has a second low voltage level value, and when the first frame rate is greater than the second frame rate, the first low voltage level value is, for example, greater than the second low voltage level value. In some embodiments, the first scanning signal has a first low voltage level value, the second scanning signal has a second low voltage level value, and when the first frame rate is greater than the second frame rate, the first low voltage level value is, for example, less than the second low voltage level value.

In some embodiments, the first scanning signal has a first low voltage level value, the second scanning signal has a second low voltage level value, and a first distance between the first high voltage level value and the first low voltage level value is different from a second distance between the second high voltage level value and the second low voltage level value. In some embodiments, when the first frame rate is greater than the second frame rate, the first distance is, for example, greater than the second distance. In some embodiments, when the first frame rate is greater than the second frame rate, the first distance is, for example, less than the second distance.

In some embodiments, the first scanning signal has a first low voltage level value, the second scanning signal has a second low voltage level value, and a third distance between the first high voltage level value and the second high voltage level value is different from a fourth distance between the first low voltage level value and the second low voltage level value. In some embodiments, when the first frame rate is greater than the second frame rate, the third distance is, for example, greater than the fourth distance. In some embodiment, when the first frame rate is greater than the second frame rate, the third distance is, for example, less than the fourth distance.

In summary, according to the method for driving an electronic device disclosed by the embodiments of the disclosure, the image data is received, the frame rate corresponding to the image data is detected, and the different scanning signals with the high voltage level value and the low voltage level value and/or the different common voltages are simultaneously generated (adjusted) according to the different frame rate (i.e., the frequency is changed). Therefore, it may decrease the leakage phenomenon, the frame flickering phenomenon, or make the charging of the pixel unit enough.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. A method for driving an electronic device, comprising:
   receiving a first image data;
   detecting a first frame rate corresponding to the first image data;
   generating at least one first scanning signal according to the first image data;
   receiving a second image data;
   detecting a second frame rate corresponding to the second image data; and
   generating at least one second scanning signal according to the second image data;
   wherein the at least one first scanning signal has a first high voltage level value, the at least one second scanning signal has a second high voltage level value, and when the first frame rate is different from the second frame rate, the first high voltage level value is different from the second high voltage level value;
   wherein the first scanning signal has a first low voltage level value, the second scanning signal has a second low voltage level value, the first low voltage level value is different from the second low voltage level value, and a first distance between the first high voltage level value and the second high voltage level value is different from a second distance between the first low voltage level value and the second low voltage level value.

2. The method for driving the electronic device according to claim 1, wherein when the first frame rate is greater than the second frame rate, the first high voltage level value is greater than the second high voltage level value.

3. The method for driving the electronic device according to claim 1, wherein the first scanning signal has a first low voltage level value, the second scanning signal has a second low voltage level value, and when the first frame rate is greater than the second frame rate, the first low voltage level value is greater than the second low voltage level value.

4. The method for driving the electronic device according to claim 1, wherein the first scanning signal has a first low voltage level value, the second scanning signal has a second low voltage level value, and a third distance between the first high voltage level value and the first low voltage level value is different from a fourth distance between the second high voltage level value and the second low voltage level value.

5. The method for driving the electronic device according to claim 4, wherein when the first frame rate is greater than the second frame rate, the first third distance is greater than the fourth distance.

6. The method for driving the electronic device according to claim 1, wherein when the first frame rate is greater than the second frame rate, the third distance is greater than the fourth distance.

7. The method for driving the electronic device according to claim 1, further comprising:
   generating a first common voltage according to the first image data; and
   generating a second common voltage according to the second image data.

8. The method for driving the electronic device according to claim 7, wherein when the first frame rate is different from the second frame rate, the first common voltage is different from the second common voltage.

9. The method for driving the electronic device according to claim 8, wherein when the first frame rate is greater than the second frame rate, the first common voltage is greater than the second common voltage.

10. A method for driving an electronic device, comprising:
    receiving a first image data;
    detecting a first frame rate corresponding to the first image data;
    generating at least one first scanning signal according to the first image data;
    receiving a second image data;
    detecting a second frame rate corresponding to the second image data; and
    generating at least one second scanning signal according to the second image data;
    wherein the at least one first scanning signal has a first low voltage level value, the at least one second scanning signal has a second low voltage level value, and when the first frame rate is different from the second frame rate, the first low voltage level value is different from the second low voltage level value;
    wherein the first scanning signal has a first high voltage level value, the second scanning signal has a second high voltage level value, and when the first frame rate is greater than the second frame rate, a first distance between the first high voltage level value and the first low voltage level value is different from a second distance between the second high voltage level value and the second low voltage level value;
    wherein when the first frame rate is greater than the second frame rate, the first distance is less than the second distance.

11. The method for driving the electronic device according to claim 10, wherein when the first frame rate is greater than the second frame, the first low voltage level value is less than the second low voltage level value.

12. The method for driving the electronic device according to claim 10, wherein the first scanning signal has a first high voltage level value, the second scanning signal has a second high voltage level value, and when the first frame rate is greater than the second frame rate, the first high voltage level value is less than the second voltage level value.

13. The method for driving the electronic device according to claim 10, wherein the first scanning signal has a first high voltage level value, the second scanning signal has a second high voltage level value, and when the first frame rate is greater than the second frame rate, a third distance between the first high voltage level value and the second high voltage value is different from a second distance between the first low voltage level value and the second low voltage level value.

14. The method for driving the electronic device according to claim 13, wherein when the first frame rate is greater than the second frame rate, the third distance is less than the fourth distance.

15. The method for driving the electronic device according to claim 10, further comprising:
   generating a first common voltage according to the first image data; and
   generating a second common voltage according to the second image data.

16. The method for driving the electronic device according to claim 15, wherein when the first frame rate is different from the second frame rate, the first common voltage is different from the second common voltage.

17. The method for driving the electronic device according to claim 16, wherein when the first frame rate is greater than the second frame rate, the first common voltage is less than the second common voltage.

* * * * *